(12) United States Patent
Burd

(10) Patent No.: US 10,174,621 B2
(45) Date of Patent: Jan. 8, 2019

(54) METHOD OF MAKING AN ARTICLE WITH INTERNAL STRUCTURE

(71) Applicant: United Technologies Corporation, Hartford, CT (US)

(72) Inventor: Steven W. Burd, Cheshire, CT (US)

(73) Assignee: United Technologies Corporation, Farmington, CT (US)

( * ) Notice: Subject to any disclaimer, the term of this patent is extended or adjusted under 35 U.S.C. 154(b) by 226 days.

(21) Appl. No.: 15/026,155

(22) PCT Filed: Sep. 24, 2014

(86) PCT No.: PCT/US2014/057128
§ 371 (c)(1),
(2) Date: Mar. 30, 2016

(87) PCT Pub. No.: WO2015/053941
PCT Pub. Date: Apr. 16, 2015

(65) Prior Publication Data
US 2016/0237828 A1    Aug. 18, 2016

Related U.S. Application Data

(60) Provisional application No. 61/887,717, filed on Oct. 7, 2013.

(51) Int. Cl.
*F01D 5/18* (2006.01)
*B29C 64/124* (2017.01)
(Continued)

(52) U.S. Cl.
CPC ............ *F01D 5/187* (2013.01); *B22F 3/1055* (2013.01); *B22F 5/04* (2013.01); *B22F 5/10* (2013.01); *B29C 64/10* (2017.08); *B29C 64/124* (2017.08); *B29C 64/153* (2017.08); *F01D 5/147* (2013.01); *F01D 5/18* (2013.01); *B33Y 10/00* (2014.12); *B33Y 50/00* (2014.12); *B33Y 80/00* (2014.12);
(Continued)

(58) Field of Classification Search
CPC ....... B22F 3/1055; B28B 1/001; B29C 64/10; B29C 64/124; B29C 64/153
USPC ....... 264/308, 401, 497; 219/121.17, 121.35, 219/121.64, 121.66, 121.85
See application file for complete search history.

(56) References Cited

U.S. PATENT DOCUMENTS

2005/0205232 A1  9/2005  Wang et al.
2008/0142186 A1  6/2008  Frasier et al.
(Continued)

FOREIGN PATENT DOCUMENTS

EP   2620594 A1    7/2013
WO   WO2014052323 A1    4/2014
WO   WO2014160695 A1    10/2014

OTHER PUBLICATIONS

International Search Report and Written Opinion for Application Serial No. PCT/US2014/057128, dated Jan. 7, 2015, 14 pages.
(Continued)

*Primary Examiner* — Leo B Tentoni
(74) *Attorney, Agent, or Firm* — Kinney & Lange, P.A.

(57) ABSTRACT

A method includes building an article by a layer-by-layer additive manufacturing process. While the article is being built, a solid outer wall is formed. An inner structure of the article is integrally formed with the outer wall. The inner structure includes an internal permeable structure.

7 Claims, 3 Drawing Sheets

(51) Int. Cl.
  *B29C 64/10* (2017.01)
  *B29C 64/153* (2017.01)
  *B22F 5/04* (2006.01)
  *F01D 5/14* (2006.01)
  *B22F 3/105* (2006.01)
  *B22F 5/10* (2006.01)
  *B33Y 10/00* (2015.01)
  *B33Y 50/00* (2015.01)
  *B33Y 80/00* (2015.01)

(52) U.S. Cl.
  CPC ...... *F05D 2230/22* (2013.01); *F05D 2230/31* (2013.01); *F05D 2250/283* (2013.01); *F05D 2260/201* (2013.01); *F05D 2300/514* (2013.01); *Y02P 10/295* (2015.11)

(56) References Cited

U.S. PATENT DOCUMENTS

| | | |
|---|---|---|
| 2008/0290215 A1* | 11/2008 | Udall .................. F01D 5/147 244/123.14 |
| 2010/0242843 A1 | 9/2010 | Peretti et al. |
| 2011/0262695 A1 | 10/2011 | Lee et al. |
| 2011/0311389 A1 | 12/2011 | Ryan et al. |
| 2012/0003086 A1 | 1/2012 | Morris et al. |
| 2013/0001837 A1 | 1/2013 | Gohler et al. |
| 2013/0236299 A1 | 9/2013 | Kington et al. |

OTHER PUBLICATIONS

Extended European Search Report for EP Application 14852734.4, dated May 31, 2017, 10 Pages.

* cited by examiner

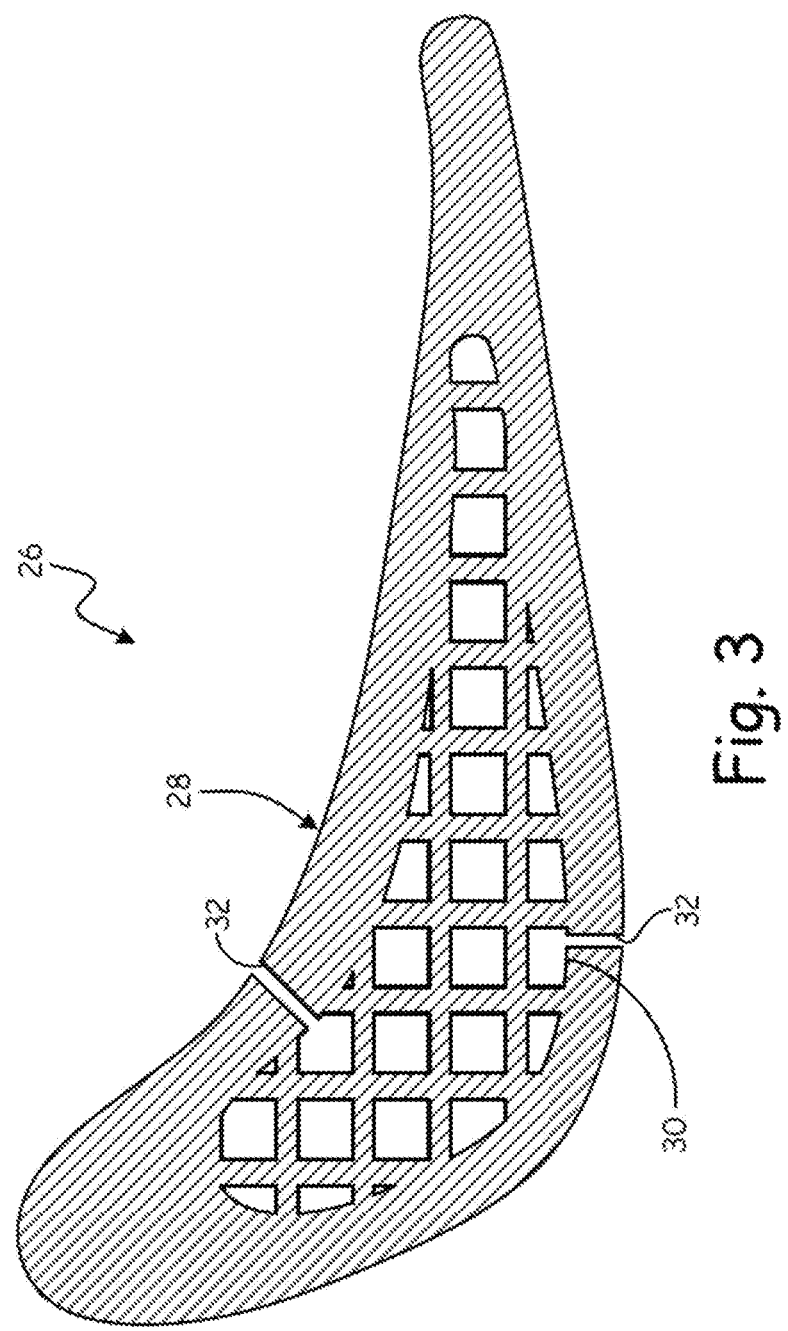

METHOD OF MAKING AN ARTICLE WITH INTERNAL STRUCTURE

BACKGROUND

This invention relates generally to the field of additive manufacturing. In particular, the present disclosure relates to internal structures of additive manufactured articles.

Additive manufacturing is an established but growing technology. In its broadest definition, additive manufacturing is any layerwise construction of articles from thin layers of feed material. Additive manufacturing may involve applying liquid, layer, or particle material to a workstage, then sintering, curing, melting, and/or cutting to create a layer. The process is repeated up to several thousand times to construct the desired finished component or article.

SUMMARY

A method includes building an article by a layer-by-layer additive manufacturing process. While the article is being built, a solid outer wall is formed. An inner structure of the article is integrally formed with the outer wall. The inner structure includes an internal permeable structure.

An apparatus includes a component built by layer-by-layer additive manufacturing. An external structure is located on an external surface of the component. An internal structure is positioned within the component and is integrally formed to the external structure. The internal structure is made of a matrix structure, honeycomb structure, or lattice structure. The internal structure provides structural support, vibration dampening, heat transfer, energy absorption, fluid flow, or piping for the component.

A method includes designing a component having an external and an internal structure. The internal structure performs at least one of structural support, vibration dampening, heat transfer, energy absorption, fluid flow, or piping for the component. The internal structure includes at least one of a matrix structure, honeycomb structure, or lattice structure. The internal structure is integrally formed to the external structure. Digital files are created defining the component on a layer-by-layer basis. The component is then produced by layer-by-layer additive manufacturing using the digital files.

BRIEF DESCRIPTION OF THE DRAWINGS

FIG. 3 is a solid sectional view of a second embodiment of an additive manufactured component with an external structure and an internal permeable structure.

DETAILED DESCRIPTION

Figure 1:
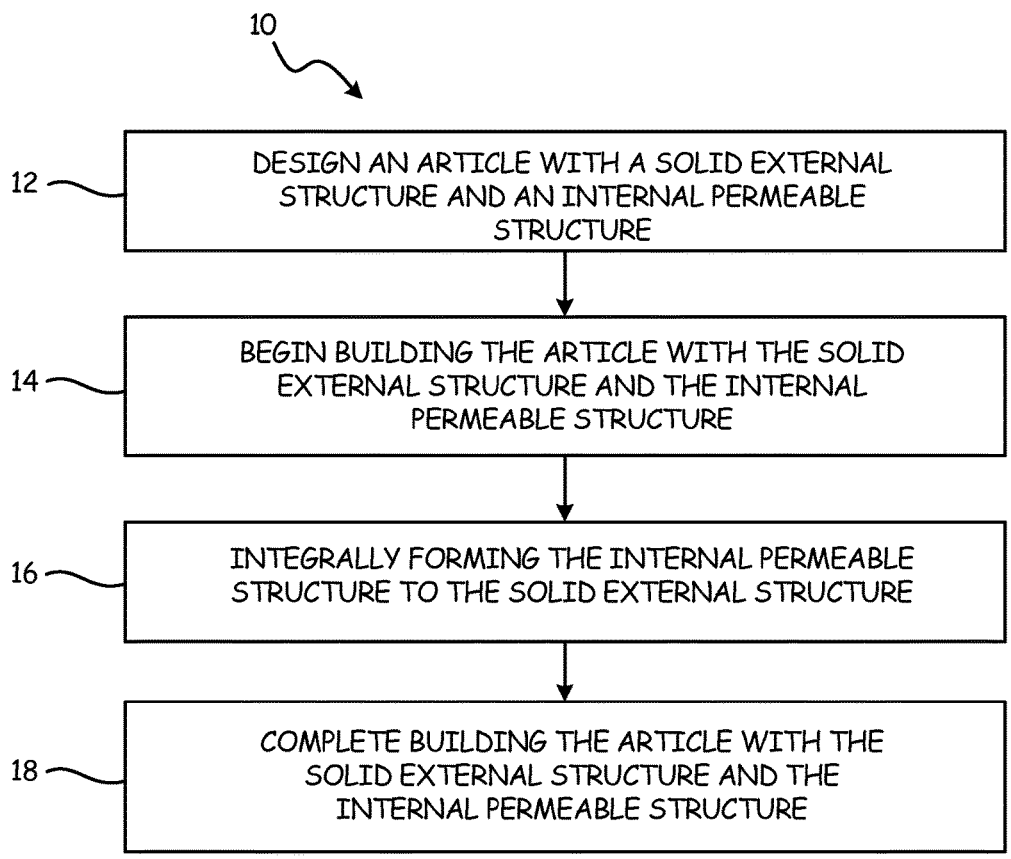
FIG. 1 is a flow-diagram representing an additive manufacturing method.

FIG. 1 is a flow-diagram representing additive manufacturing process 10. Additive manufacturing process 10 includes steps 12-18. Step 12 includes designing an article with a solid external structure and an internal permeable structure. Step 14 includes beginning to build the article with the solid external structure and the internal permeable structure. Step 16 includes integrally forming the internal permeable structure to the solid external structure. Step 18 includes completing building the article with the solid external structure and the internal permeable structure.

With additive manufacturing process 10, complex geometries of an internal permeable structure are achievable which may not be economically feasible with traditional non-additive manufacturing processes. Additive manufacturing process 10 eliminates the need to employ commonly expensive traditional non-additive manufacturing processes of forming an internal permeable structure during or after the build of the article. Additionally, employing traditional non-additive manufacturing processes to create complex geometries can become very expensive. An internal permeable structure integrally formed with the article, made possible by additive manufacturing process 10, enables fewer raw materials to be used therefore decreasing the weight of the article, while still maintaining a high degree of structural integrity and tensile strength. The decreased amount of raw materials also provides a lower-cost alternative to articles with a solid inner structure.

Example of types of additive manufacturing that can be used for additive manufacturing process 10 can include metal laser sintering and electron beam melting among others. Metal Laser Sintering includes using a powder material as feedstock and progressively building thin layers by selectively melting the powder material using a laser. Electron Beam melting includes using a powder material as feedstock and progressively building thin layers by selectively melting the powder material using an electron beam.

Complex geometries incorporated with non-additive manufacturing processes are often expensive, add weight, and increase the part count of an overall assembly. Additive manufacturing process 10 can achieve designs with complex geometries of the internal permeable structure more easily than non-additive manufacturing processes and allows for a variety of functional uses to be designed into the internal permeable structure.

Functional uses of the internal permeable structure may include vibration dampening, heat transfer, stiffening, strengthening, fluid flow, energy absorption, or piping. The internal permeable structure may include a heat transfer structure, mounting structure, honeycomb structure, matrix structure, lattice structure, piping structure, or filter structure.

Figure 2:
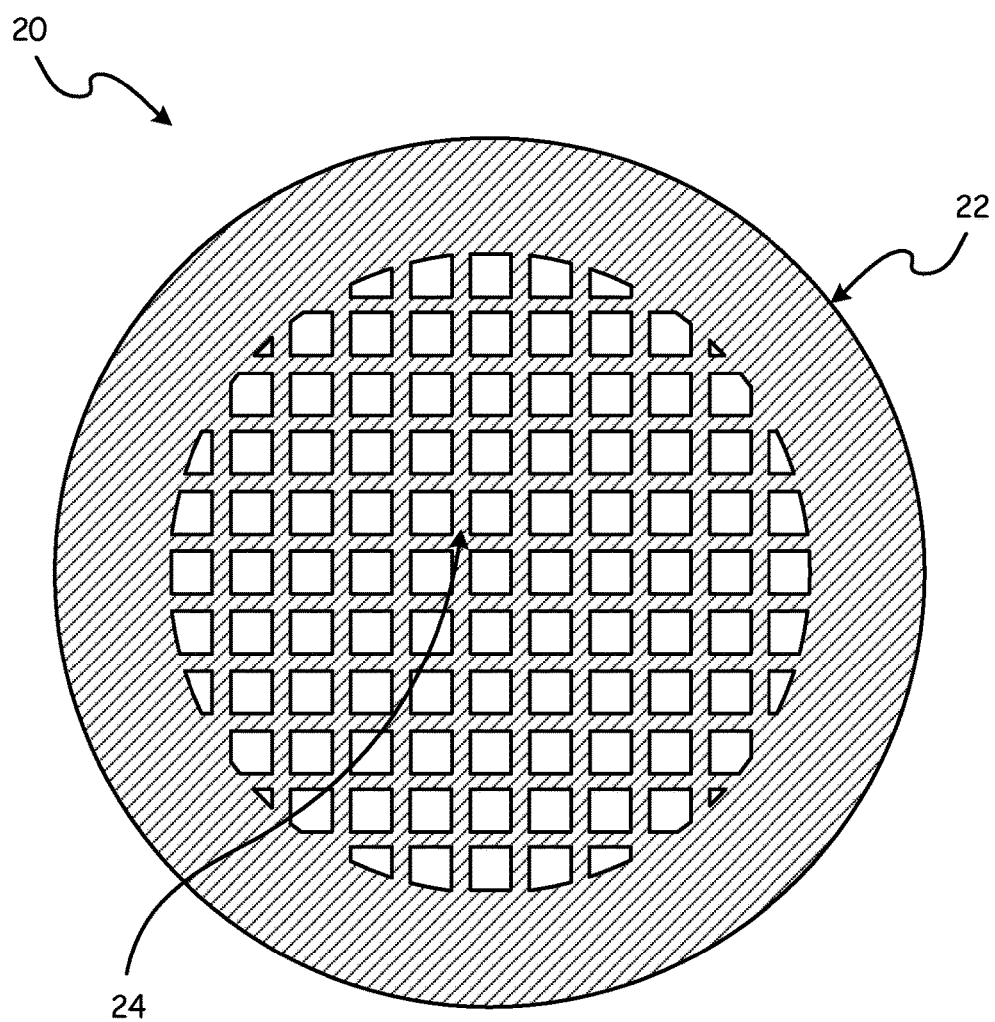
FIG. 2 is a solid sectional view of a first embodiment of an additive manufactured component with an external structure and an internal permeable structure.

FIG. 2 is a solid sectional view of a first embodiment of additively manufactured component 20 with external structure 22 and internal permeable structure 24. Component 20 includes external structure 22. External structure 22 defines an outer wall of component 20. Internal permeable structure 24 is located within external structure 22. Internal permeable structure 24 is integrally formed to external structure 22 through additive manufacturing process 10.

An example of component 22 includes a tube used in a gas turbine engine to transport a fluid. Internal permeable structure 24 provides a porous medium allowing fluid to pass through internal permeable structure 24. Internal permeable structure 24 also provides internal structural support to the tube to help the tube withstand forces commonly experienced during the use of a gas turbine engine.

Either end of the tube may include an opening allowing a fluid to enter and exit the tube. Examples of fluid entering into the tube of a gas turbine engine may include oil, fuel, gas, or air.

FIG. 3 is a solid sectional view of a second embodiment of additively manufactured component 26 with external structure 28 and internal permeable structure 30. Component 26 includes external structure 28. External structure 28 defines an outer wall of component 26. Internal permeable structure 30 is located within external structure 28. Internal permeable structure 30 is integrally formed to external structure 28 through additive manufacturing process 10. External structure 28 includes cooling channels 32 that extend from inner structure 30 to an external environment outside of component 26.

An example of component 26 includes an airfoil used in a gas turbine engine. Gas turbine engine airfoils are commonly hollow and include cooling passages passing through the airfoil. Internal permeable structure 30 provides a porous medium allowing fluid to pass through internal permeable structure 30. Internal permeable structure 26 eliminates the need to employ complex and expensive machining methods to remove material from solid parts in order to create cooling channels in the airfoil.

Cooling channels 32 provide fluid communication between internal structure 30 and an external environment outside of component 26. Cooling channels 32 may provide a cooling function to component 26 by allowing cooler ambient air to enter into internal structure 30 of component 26 and absorb thermal energy from internal structure 30. Cooling channels 32 also allow for air to exit component 26 to expel the air heated up from the thermal energy contained in internal structure 30.

In the example of an airfoil, cooling channels 32 may run the length of the airfoil either vertically or horizontally through the airfoil. Additionally, some of cooling channels 32 may allow flow of a fluid in to internal structure 30 from an exterior environment outside of component 26. Some of cooling channels 32 may also allow flow of a fluid to an exterior environment outside of component 26 from internal structure 30.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
    building a tube by a layer-by-layer additive manufacturing process, wherein the tube is configured to transport a fluid, wherein the tube comprises;
        a first end configured to allow the fluid to enter the tube; and
        a second end configured to allow the fluid to exit the tube; and
    integrally forming, while building the tube, an external structure and an internal permeable structure of the tube, wherein the external structure defines an outer wall of the tube, wherein the external structure defines a passage within the tube, wherein the internal permeable structure is configured within the passage to allow transport of the fluid through the tube, wherein the internal permeable structure comprises a matrix structure, a honeycomb structure, or a lattice structure, wherein the internal permeable structure is configured to perform at least one of vibration dampening, structural support, heat transfer, energy absorption, fluid flow, or piping.

2. The method of claim 1, wherein the outer wall includes cooling channels extending from the inner structure to an exterior environment outside of the article.

3. The method of claim 1, wherein the article comprises a component designed for use in a gas turbine engine.

4. A method comprising:
    designing a tube configured to transport a fluid, wherein the tube comprises:
        a first end configured to allow the fluid to enter the tube;
        a second end configured to allow the fluid to exit the tube; and
        an external structure that defines an outer wall of the tube and that defines a passage within the tube; and
        an internal permeable structure integrally formed to the external structure, wherein the internal permeable structure is configured within the passage to allow transport of a fluid through the tube, wherein the internal permeable structure performs at least one of vibration dampening, structural support, heat transfer, energy absorption, fluid flow, or piping, and wherein the internal permeable structure includes at least one of a matrix structure, honeycomb structure, or lattice structure;
    creating digital files defining the tube on a layer-by-layer basis; and
    producing the tube by layer-by-layer additive manufacturing using the digital files.

5. The method of claim 4, wherein the fluid comprises oil, fuel, gas, or air.

6. The method of claim 4, wherein the tube comprises a part designed for use in a gas turbine engine.

7. The method of claim 4, wherein the external structure includes cooling channels extending from the internal permeable structure to an exterior environment outside of the tube.

* * * * *